May 7, 1940.　　　　　J. L. BARR　　　　　2,199,870
WEIGHT RELIEVING DEVICE
Original Filed May 25, 1934　　2 Sheets-Sheet 1
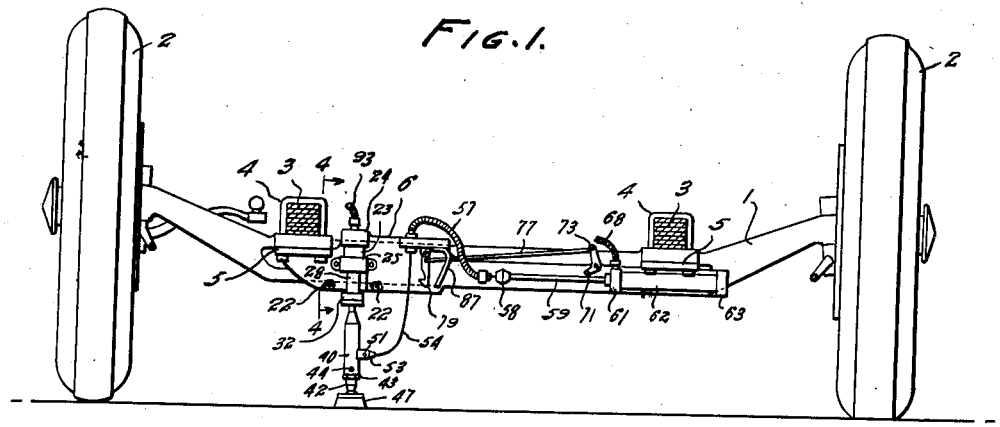
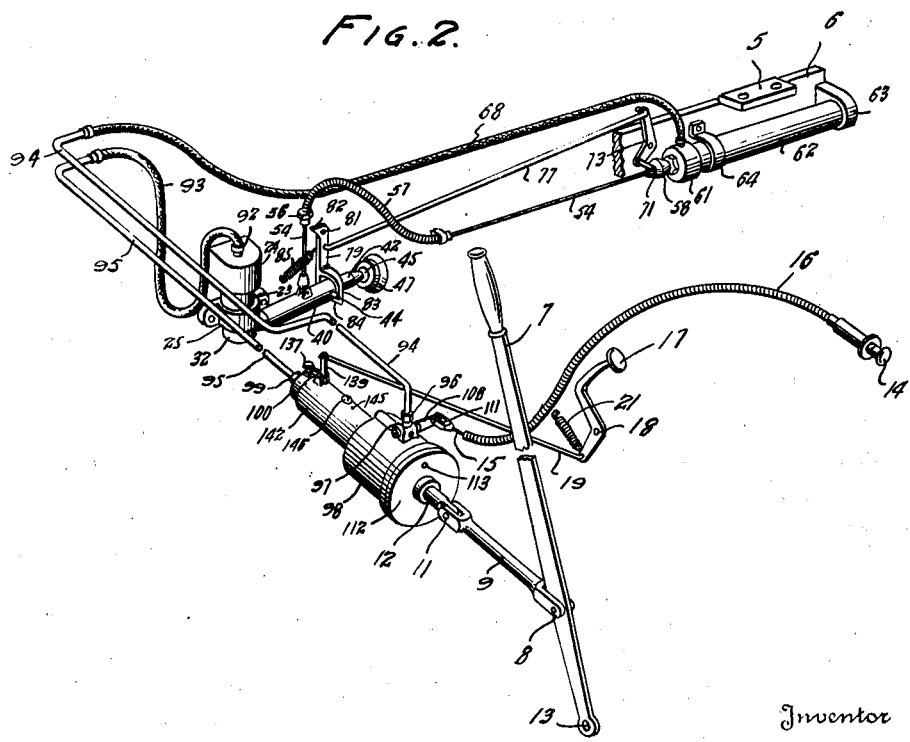
Inventor
JOHN L. BARR
By Semmes & Semmes
Attorneys May 7, 1940. J. L. BARR 2,199,870
WEIGHT RELIEVING DEVICE
Original Filed May 25, 1934 2 Sheets-Sheet 2
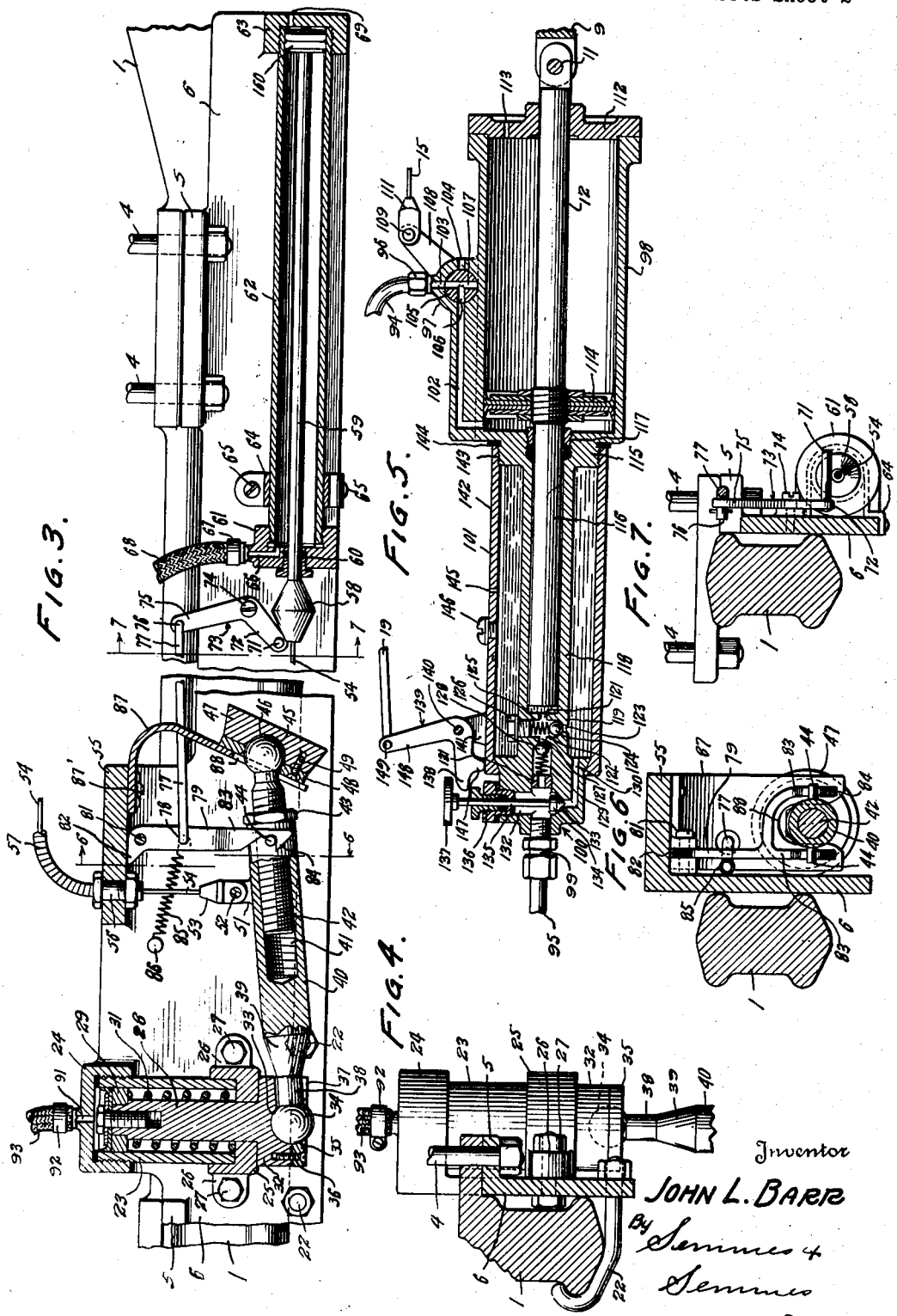
Inventor
JOHN L. BARR
By Semmes & Semmes
Attorneys Patented May 7, 1940

2,199,870

UNITED STATES PATENT OFFICE 2,199,870

WEIGHT RELIEVING DEVICE

John L. Barr, Chevy Chase, Md.

Application May 25, 1934, Serial No. 727,569
Renewed December 23, 1938

13 Claims. (Cl. 280—150)

My invention relates to means for facilitating the steering of vehicles, such as automotive vehicles, where sharp turning of the steering wheels is desirable without undue effort. It is of peculiar utility in parking and unparking vehicles in confined quarters, and in other operations which require cramping of the wheels where the vehicle is substantially at a standstill.

It is an object of my invention to provide fluid means for effecting the entire operation of a lift mechanism which shall relieve the weight at least in part on at least one of the steering wheels of a vehicle.

Another object of my invention is to devise a novel form of fluid controlled latch which will prevent displacement of the lift mechanism from its inoperative position.

Yet another object of my invention is to provide a device which will move the lift mechanism from inoperative to operative position quickly and easily, and which will then apply a large force to effect the actual desired lift to relieve the weight on at least one of the steering wheels, sufficiently to permit ready turning of the steering wheels.

Another object of the invention is to provide a device which is simply and easily constructed and which has few operating parts and which is easily repaired or replaced.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions, which, for the purpose of explanation, have been made the subject of illustration.

In the drawings:

Figure 1 is a front elevation of the front steering wheels of an automobile showing the lifting mechanism in operative position.

Figure 2 is a detailed view showing the operating parts in perspective;

Figure 3 is a view partly in section showing my lift mechanism in raised position, as well as the latch mechanism; this view is taken from the front of the car;

Figure 4 is a view taken along line 4—4 of Figure 1, looking in the direction of the arrows and shows the detail for the mounting of the lift cylinder on the front axle;

Figure 5 is a sectional view taken along the longitudinal axis of the hand pump;

Figure 6 is a detailed view taken along line 6—6 of Fig. 3, looking in the direction of the arrows;

Figure 7 is a detailed view taken along line 7—7 of Fig. 3, looking in the direction of the arrows.

Referring to the drawings, I have shown a front axle of the car 1 on which are mounted front steering wheels 2. The front springs are indicated by the numeral 3. The front springs are held by U-bolts 4 to the front axle, the U-bolts being attached through brackets 5.

Mounted on the front axle 1 is a base plate 6 which supports the lift mechanism about to be described. Near the driver's seat is located a pump handle 7 which is pivoted at 8 to a link 9. The link 9 is pivoted at 11 to a piston rod 12. Pump handle 7 is also pivoted to a fixed point on the car as indicated at 13. The diagrammatic perspective showing in Fig. 2 shows the connections just referred to. Mounted on the dash of the car is a button 14 which controls a Bowden wire 15 that slides in a sheath 16.

On the floor board of the car is a foot pedal 17 which is pivoted at 18 and which has its end pivoted to control rod 19. Spring 21 tends to hold pedal 17 in the up position.

The base member 6 is suitably attached to the front axle of the car by proper fastening means. In Fig. 1, I have shown bolts 22 which may subserve this purpose. Other bolts (not shown) or other types of fastening means may be employed to attach the base firmly to the front axle. The brackets 5 which I have referred to may be integrally formed with the base 6 and the U-bolts 4 thus tend to hold the base 6 firmly in place.

The pedal 17 is for the purpose of acting as a foot release to permit the weight of the car to come back on the steering wheels after raising action has been effected and the wheels turned. Its functioning will be later described. The button 14 on the dashboard of the car is for the purpose of effecting the control in raising and lowering the compression element to operative position. This will be later described.

The lift device comprises a cylinder 23 which is screw threaded into a cylinder head 24 which may be integrally formed with the base 6. The other end of the cylinder 23 fits into another cylinder head 25 which is supported by a bracket 26 which is held by bolts 27 to the base 6.

Adapted to slide through the cylinder head 25 is a piston 28 which carries a piston head assembly 29 of the usual fluid tight construction. Between the piston head 29 and the cylinder head 25 is a helical compression spring 31.

The piston 28 has an enlarged socket support 32 provided with a socket 33 in which a ball 34 fits. The ball is held by holding plate 35 that is secured in position by means of screws 36. There is provided a recess 37 in the support 32 and in the plate 35 so that a stem 38 on which the ball is mounted can pass up into the aperture 37 in the position of the parts shown in Figure 3 when the compression element is swung out of position. The stem 38 is enlarged into a conical section 39 which is united to a female body portion 40 having internal screw threads 41 adapted to fit in screw threads on screw threaded member 42, which is firmly held in place once the length of the compression element has been determined, by a lock nut 43 on the outside of the female member 40. Lugs 44 on member 40 are adapted to engage latching mechanism to hold the compression element in the up position, see Fig. 3.

The male member 42 carries a ball 45 which fits within socket 46 formed in a conical foot 47. A holding plate 48 holds the ball in place in the foot and is itself held by screws 49.

There is a bracket 51 provided on the female member 40 of the compression element to which is pivoted at 52 a Bowden wire connection 53 to which is attached Bowden wire 54. Bowden wire 54 passes up through a bracket 55 passing through a Bowden wire fitting 56 inserted in the bracket 55. Bowden wire 54 slides within a sheath 57. This Bowden wire 54 is attached to one end of a conical cam member 58 whose other end is attached to piston rod 59. Piston rod 59 passes through a fluid type packing gland 60 in a cylinder head 61 which is screw threaded to a cylinder 62. The cylinder 62 is provided at the other end with a cylinder head 63 which may be formed integral with the base 6, and the cylinder 62 is screw threaded into this cylinder head 63. The other end of the cylinder is supported by a bracket 64 which is screwed as indicated at 65 to the base 6. The cylinder head 61 has a port 66 which communicates through a coupling 67 with a flexible tube 68. There is a port provided at 69 in the cylinder head 63.

The double conical cam 58 is adapted to contact with an operating finger 71 which is carried on one arm 72 of a bell crank lever 73 which is pivoted as indicated at 74 on the base 6, the other arm 75 of the bell crank lever 73 being pivotally attached as indicated at 76 to an operating rod 77.

The operating rod 77 is pivotally attached as indicated at 78 to a latch mechanism 79 which is pivoted on pivot 81 which is supported on the base 6. The latch 79 is provided with a stop 82 which forbids its rotation around the pivot 81 further than is indicated in Fig. 3, by reason of the contact of the stop 82 with the underside of the bracket 55. The other end of the latch 79 is provided with bifurcated arms 83 having holding ends 84 which, in the position of the parts shown in Figure 3, fit over the lugs 44 formed on the exterior of the female compression element 40.

A spring 85 tensions the latch 79 into the position indicated in Fig. 3 of the drawings. The spring 85 is fastened to the base 6 at 86 and is suitably attached to the latch 79. Attached to the underside of the bracket 55 by rivets 87', or some other suitable fastening means, is an anti-rattle leaf spring element 87 which is provided with a slot 88 that is adapted to fit over the top of the ball 45 and the male member 42 of the compression element. This anti-rattle spring 87 fits against the top of the foot 47 and puts the parts under spring pressure to hold them in spring pressed relationship when the latch 79 is in engagement with the lugs 44 of the compression element. This arrangement prevents undue motion of the parts and objectionable rattling noises.

The cylinder head 24 of the cylinder 23 is provided with a port 91 which communicates with a fitting 92 to which is attached a flexible pipe 93.

The flexible pipe 68 is coupled to a pipe 94, and the flexible pipe 93 is coupled to a pipe 95. The pipe 94 is attached by means of a coupling 96 to a valve construction 97 located on the top of a gas compression cylinder 98. The pipe 95 is coupled through a suitable coupling 99 into a valve head 100 located at one end of a liquid containing cylinder 101. The gas, air in this case, from the cylinder 98 is adapted to effect the latching and unlatching of the compression element, and also effects its lowering into operative position and its raising into inoperative position, as shown in Fig. 3. This will be later described.

The liquid compressing mechanism about to be described gives a liquid under pressure that furnishes the actual lifting power to enable the compression element to expand to raise that part of the vehicle to which it is attached to relieve the weight at least in part on at least one of the steering wheels of the vehicle. It has been found that if the weight is relieved on only one of the steering wheels, this will permit ready turning of the other wheel. It has also been found that it is not necessary with my device to completely relieve the weight on even one of the wheels to greatly facilitate movement of the wheels to aid in turning the car in close quarters, such as occur in parking and unparking a car in confined spaces.

The valve 97 (see Fig. 5) is provided with a port 102, a port 103, and a port 104. There is a rotary valve mechanism 105 which is provided with the usual T-port construction comprising port 106, and a port 107 that runs all the way through the valve. This rotary valve member 105 is adapted to be rotated by an attached arm 108 which is pivoted at 109 to a link structure 111 which is attached to Bowden wire 15 which has been previously referred to, and which is controlled by the dash button 14.

Cylinder 98 is provided with a head 112 which has a relief port 113 therein. In the head 112 is adapted to slide piston rod 12, above referred to. Piston rod 12 carries a fluid tight piston construction 114 of the usual type which may be screw threaded onto the piston rod 12. A description of the details of this fluid tight piston head does not appear to be necessary as they are well known in the art. The cylinder 98 is provided with a head 115 through which passes an extension 116 of the piston rod 12. There is provided the usual fluid tight slide joint indicated generally by numeral 117. The extension 116 of the piston rod 12 is adapted to reciprocate in smaller high pressure cylinder 118 which furnishes liquid under high pressure that causes the actual lifting of the vehicle after contact of the foot 47 with the roadway.

At one end of the cylinder 118 is a head 119 having a port 121 which leads into a valve aperture 122 which is provided with a port 123. A ball 124 is adapted normally to close the entrance to port 123 and is held in place by spring 125 on which bears a pressure plug 126 of the usual construction. Leading from the valve aperture 122 is another port 127 which is normally closed by ball 128 that is spring pressed by means of a spring 129 against its seat.

There is an apertured screw threaded plug 131 against which one end of spring 129 bears and which permits passage of fluid into a central valve opening 132. Seated in the conical seat 133 provided in the port opening 130 is a conical valve member 134 carried by operating valve stem 135. The stem passes through a packing gland 136 of the usual type and has mounted on its end an annular operating member 137. The annular operating member 137 lies above the upper part of a bell crank arm 138 of the bell crank lever 139 which is pivoted at 140 on a support 161 which is attached to a reservoir cylinder 142.

The reservoir cylinder 142 makes a fluid tight connection with the head 100 and is screwed at 143 onto the member 115 with a suitable packing 144 lying between cylinder 142 and member 115. Reservoir cylinder 142 has a breather hole 145 and a filling plug 146.

Bell crank lever 139 has its arm 138 provided with a stop member 147 which is adapted to arrest downward motion of the arm 138 in some desired position, such as that shown in Fig. 5. The bell crank lever 139 has an arm 148 which is pivoted at 149 to the operating rod 19. The fitting 99 and the head 100 makes connection between valve aperture 132 and pipe 95.

Let us assume that the compression element is in its up position as indicated in Fig. 2. The position of the button 14 on the dash is such as to place the operating arm 108 in the position shown in Fig. 2, which is the same as that shown in Fig. 5. In this position of the valve, there is a straight connection between pipe 94, port 102 and the interior of the cylinder 98. The hand lever 7 is grasped by the operator and pulled so that the piston 114 is caused to travel toward the other end of the cylinder 98. When this occurs, air is expelled through port 113, the air which is in the cylinder 62 which lies in front of a piston head 160 is sucked in through pipe 68, pipe 94 into cylinder 98. This draws piston head 160 to a position in the left hand end of cylinder 62.

Viewing the mechanism from the direction in which the drawing of Fig. 3 is taken, the following occurs: Cam surfaces 58 contact with the operating finger 71 and rock bell crank lever 73 in a clockwise direction, pulling on rod 77 and moving latch 79 to the right against the tension of spring 85. This releases the lugs 44 from engagement with catches 84 and permits the compression element to drop downwardly out of engagement with its upper latch position. Moreover, since the Bowden wire construction 54 is pushed outward through the sheath 57, the compression element is forced downward in addition to the force exerted by gravity.

In the meantime, cylinder 118 has been filled with oil or other suitable operating fluid from cylinder 142 which, as shown in the drawings, is almost full of oil. This oil has entered past ball 124 and against the tension of the spring above it. The cylinder 118 therefore is now full of oil and the extension 116 of the piston rod 12 is at its extreme right position, viewing the structure from the same direction that the view in Fig. 5 was taken.

The operator now pulls on the button 14 to rotate the valve 105 so that port 107 communicates with port 104 thus permitting the air to escape in front of piston 114 upon movement of the piston rod 12 under the influence of the operating handle 7 to the left, with the parts in the position shown in Fig. 5. While air is escaping, however, the oil in cylinder 118 has been ejected through movement of the hand lever 7 past ball 128 and into pipe 95, flexible pipe 93 and into cylinder 23 where it presses downwardly on the piston head in that cylinder compressing spring 31 and exerting lifting forces on the portion of the car to which the device is attached to relieve at least in part weight on at least one of the steering wheels.

After the turning operation of the wheels, it is desirable to raise the lift mechanism back into the position shown in Fig. 3. It is accomplished through moving the button 14 to place the valve 105 in the position shown in Fig. 5. Foot pedal 17 is pressed downwardly, which draws on rod 19 thus causing lever arm 138 of bell crank lever 139 to press upwardly on release disc 137 (see Fig. 5) and open port 129 so that oil under pressure in cylinder 23 can pass through pipe 93, pipe 95 into valve aperture 132 through port 130 and into the interior of the reservoir cylinder 142.

In the meantime, a movement of the handle 17 into the position shown in Fig. 2 will have ejected the oil in cylinder 118 from in front of the extension 116 of piston rod 12 past valve 128 and back into cylinder 142. Moreover, the air in front of piston 114 will have passed through valve 105 and to pipe 94, thence into pipe 68 which will move piston 160 again into the position in which it is shown in Fig. 3. This will pull on the Bowden wire 54 and pull the lift mechanism up into the position shown in Fig. 3, where it is again latched in place by reason of the action of the spring 85.

It is to be noted that the bifurcated arms 83 of the latch 79 are provided with sloped surfaces 161 which cause the latch member to readily pass the lugs 44 of the female element 40 of the compression element. The parts are now again in the position shown in Fig. 2. Foot pressure is released on pedal 17 and the operating mechanism assumes the positions indicated in Figs. 3 and 5 and the cycle may be repeated.

The compression element it will be noted is capable of movement to compensate for the various movements to which it is subjected in cramping the steering wheels. These movements are fully explained in application Serial No. 724,168, filed May 5, 1934.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a device of the character described, a lift mechanism, a latch therefor, a cylinder, a piston in the cylinder, means to introduce fluid under pressure into the cylinder to move the piston, a piston rod, a cam thereon to release the latch, a pivoted member against which the cam is adapted to contact, and a link from the pivoted member to the latch.

2. In a device of the character described, a lift mechanism, a latch therefor, a cylinder, a piston in the cylinder, means to introduce fluid under pressure into the cylinder to move the piston, a piston rod and a cam thereon to release the latch, spring means to return the latch to holding position, a pivoted member against which the cam is adapted to contact, and a link from the pivoted member to the latch.

3. In a device to facilitate the turning of the steering wheels of a vehicle, a lift mechanism operated by liquid under pressure said lift mechanism being supported by the vehicle, cylinder means in which are generated air under pressure and a liquid under pressure, means connecting the liquid under pressure from said cylinder to the lift mechanism, a latch to hold the lift mechanism in inoperative position, a latch operating mechanism, means connecting the air under pressure from the cylinder to the latch operating mechanism, and air operated means associated with said lift mechanism to effect the swinging of the lift mechanism into operative or inoperative position.

4. In a device to facilitate the turning of the steering wheels of a vehicle, a lift mechanism operated by liquid under pressure said lift mechanism being supported by the vehicle, cylinder means in which are generated air under pressure and a liquid under pressure, means connecting the liquid under pressure through said cylinder to the lift mechanism, control means on said cylinder, a latch to hold the lift mechanism in inoperative position, a latch operating mechanism responding to the controls on the cylinder, means connecting the air under pressure from the cylinder to the latch operating mechanism, and air operated means associated with said lift mechanism to effect the swinging of the lift mechanism into operative and inoperative position through the controls on the cylinder.

5. In a device of the character described to facilitate the turning of the steering wheels of a vehicle, a lift mechanism supported by the vehicle, fluid pressure operated means to bring the lift mechanism into operative position, a fluid operated latch device for releasing the lift mechanism from inoperative position, a source of fluid under pressure, a cylinder for the lift mechanism, a piston operating in the cylinder said lift mechanism being universally supported by the piston, and means connecting the source of fluid under pressure and the cylinder to operate the lift mechanism to relieve the weight on at least one of the steering wheels of the vehicle.

6. In a device of the character described to facilitate the turning of the steering wheels of a vehicle, a lift mechanism supported by the vehicle, a source of fluid under pressure, a cylinder, a piston movable in the cylinder, said lift mechanism being universally supported by the piston, a second cylinder, a piston in said second cylinder, devices interconnecting said cylinders with the source of fluid, means to cause a differential pressure on either side of said second mentioned piston, means to cause the fluid to move the first mentioned piston to operate the lift mechanism to relieve the weight on at least one of the steering wheels of the vehicle, and means associated with said second piston and the lift mechanism to permit a swinging of the lift mechanism into operative position, said last named means comprising a fluid operated latch device for releasing the lift mechanism from inoperative position.

7. In a device of the character described to facilitate the turning of the steering wheels of a vehicle, a lift mechanism supported by the vehicle, fluid pressure operated means to bring the lift mechanism into operative position, a source of liquid under pressure, a cylinder for the lift mechanism, a piston operated in the cylinder said lift mechanism being universally supported by the piston, and means connecting the source of liquid under pressure and the cylinder to operate the lift mechanism to relieve the weight on at least one of the steering wheels of the vehicle, said means for moving the lift mechanism into operative position being adapted to move quickly, and the liquid operating means being adapted to exert large force but being relatively slow in action.

8. In a device of the character described to facilitate the turning of the steering wheels of a vehicle, a lift mechanism supported by the vehicle, a source of fluid under pressure, a cylinder, a piston movable in the cylinder, said lift mechanism being universally supported by the piston, a second cylinder, a piston in said second cylinder, devices interconnecting said cylinders with the source of fluid, means to cause a differential pressure on either side of said second mentioned piston, means connecting the second mentioned piston and the lift mechanism to permit a swinging of the lift mechanism into operative position, means to cause the fluid to move the first mentioned piston to operate the lift mechanism to relieve the weight on at least one of the steering wheels of the vehicle, said means for moving the lift mechanism into operative position being adapted to move quickly and the liquid operating means being adapted to exert large force but being relatively slow in action.

9. A device to facilitate the turning of the steering wheels of a vehicle comprising a lift mechanism supported by the vehicle, a latch therefor, a cylinder, a piston in the cylinder, means to introduce fluid under pressure into the cylinder to move the piston, a piston rod, a cam thereon to release the latch, and means against which the cam is adapted to contact to release the latch to permit the lift mechanism to move to operative position.

10. In a device of the character described to facilitate the turning of the steering wheels of a vehicle, a lift mechanism supported by the vehicle, a source of fluid under pressure, a cylinder, a piston movable in the cylinder, said lift mechanism being universally supported by the piston, a second cylinder, a piston in said second cylinder, devices interconnecting said cylinders with the source of fluid, means to cause a differential pressure on either side of said second mentioned piston, means to cause the fluid to move the first mentioned piston to operate the lift mechanism to relieve the weight on at least one of the steering wheels of the vehicle, and means connecting the second mentioned piston and the lift mechanism whereby said lift mechanism is permitted to swing from an inoperative to an operative position.

11. A device for facilitating the turning of the steering wheels of a vehicle comprising a lift mechanism supported by the vehicle, a latch therefor, a cylinder, a piston in the cylinder, means to introduce fluid under pressure into the cylinder to move the piston, a piston rod having a surface thereon adapted to release the latch, spring means to return the latch to holding position and a pivoted member against which the latch releasing portion of the piston rod is adapted to contact to release the latch to permit the lift mechanism to move to operative position.

12. A device for facilitating the turning of the steering wheels of a vehicle comprising a lift mechanism supported by the vehicle, a latch therefor, a cylinder, a piston in the cylinder, means to introduce fluid under pressure into the cylinder to reciprocate the piston, a piston rod, a cam surface thereon adapted to release the latch, spring means to return the latch to holding position, and a pivoted member against which the cam is adapted to contact to release the latch to permit the lift mechanism to move to operative position.

13. A device for facilitating the turning of the steering wheels of a vehicle comprising a lift mechanism supported by the vehicle, a latch pivotally mounted at one end to the vehicle and having a bifurcated portion at the opposite end for fitting around the lift mechanism to hold said mechanism in inoperative position, a cylinder, a piston in the cylinder, means to introduce fluid under pressure into the cylinder to move the piston, a piston rod, a cam surface thereon to release the latch, spring means to return the latch to holding position, and a pivoted member against which the cam surface is adapted to contact to release the latch to permit the lift mechanism to move to operative position.

JOHN L. BARR.